United States Patent
Swanson et al.

(10) Patent No.: US 7,951,320 B1
(45) Date of Patent: May 31, 2011

(54) METHOD OF MOLDING A BULKHEAD FITTING

(75) Inventors: Mark Swanson, San Rafael, CA (US); Mark Brosius, Emerald Hills, CA (US)

(73) Assignee: Kitisis Corporation, Richmond, CA (US)

( * ) Notice: Subject to any disclaimer, the term of this patent is extended or adjusted under 35 U.S.C. 154(b) by 672 days.

(21) Appl. No.: 11/361,623

(22) Filed: Feb. 24, 2006

Related U.S. Application Data

(60) Provisional application No. 60/655,408, filed on Feb. 24, 2005.

(51) Int. Cl.
*B29C 45/00* (2006.01)

(52) U.S. Cl. .................... 264/328.1; 264/250; 264/318; 264/334

(58) Field of Classification Search ............. 264/328.13, 264/318, 334
See application file for complete search history.

(56) References Cited

U.S. PATENT DOCUMENTS

| | | | |
|---|---|---|---|
| 3,595,301 A | 7/1971 | Bauer | |
| 4,077,759 A * | 3/1978 | Saumsiegle et al. | 425/451 |
| 4,603,831 A | 8/1986 | Krishnakumar et al. | |
| 4,695,421 A * | 9/1987 | Takeda | 264/318 |
| 5,080,576 A | 1/1992 | Bethurum et al. | |
| 5,209,888 A | 5/1993 | Shimada et al. | |
| 5,490,966 A | 2/1996 | Peterson et al. | |
| 5,741,446 A | 4/1998 | Tahara et al. | |
| 5,804,123 A | 9/1998 | Klomhaus et al. | |
| 6,171,539 B1 | 1/2001 | Sakata | |
| 6,474,978 B2 | 11/2002 | Moria et al. | |
| 6,578,207 B1 * | 6/2003 | Fratilla | 4/492 |
| 6,663,810 B1 | 12/2003 | Lee | |
| 6,877,524 B2 * | 4/2005 | Vasilev | 137/528 |
| 6,939,500 B2 * | 9/2005 | Bernard | 264/328.9 |

* cited by examiner

*Primary Examiner* — Matthew J Daniels
*Assistant Examiner* — Jacob Thomas Minskey
(74) *Attorney, Agent, or Firm* — Jay P. Hendrickson

(57) ABSTRACT

A method of using an injection mold assembly to fabricate a bulkhead fitting. The method includes using a core plate, aperture plate and a pair of slide blocks to form the mold assembly which contains the mold cavity. The aperture plate, which has an opening through the plate, is positioned within the assembly such that the fitting, which is molded within the mold cavity, does not contain a parting line across the sealing surface and o-ring groove of the fitting.

4 Claims, 12 Drawing Sheets

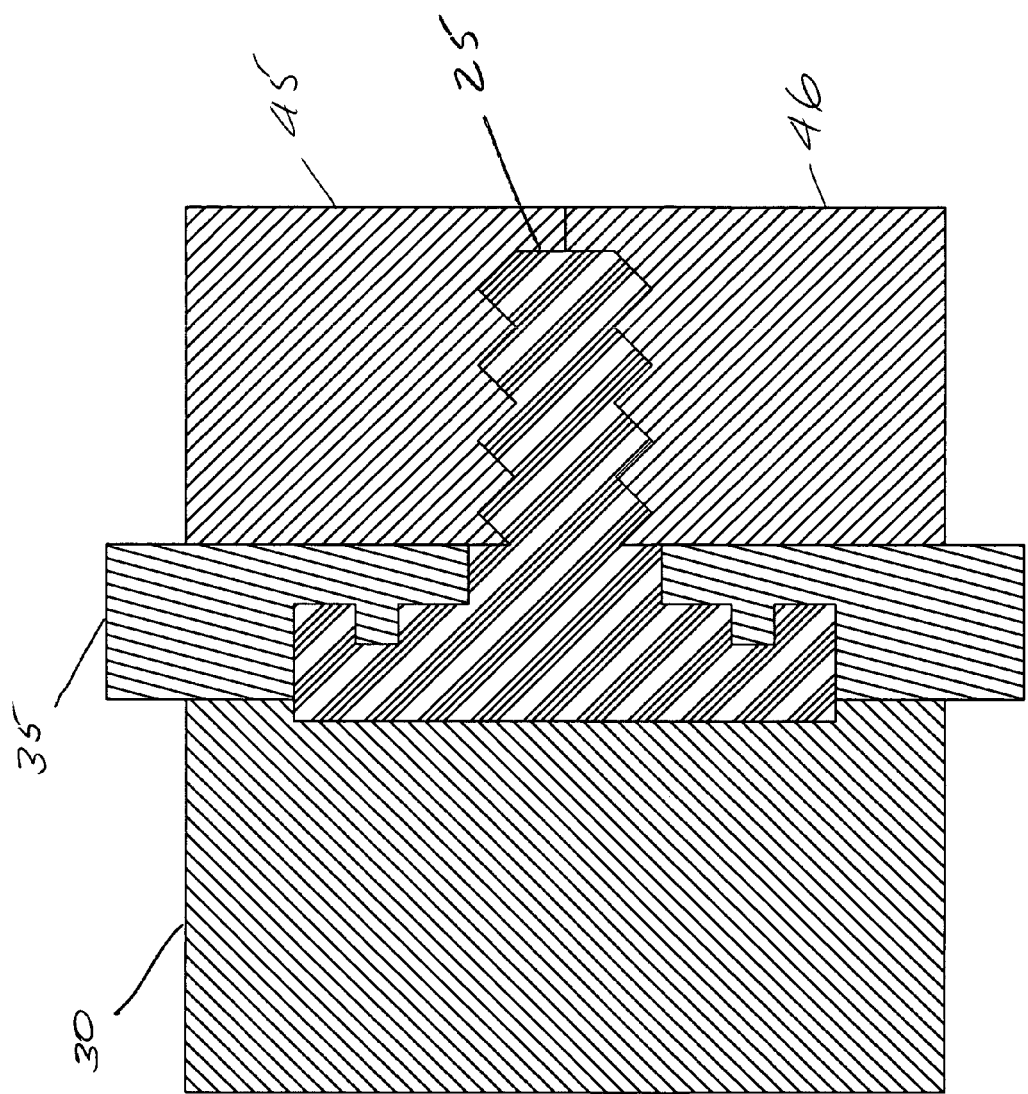

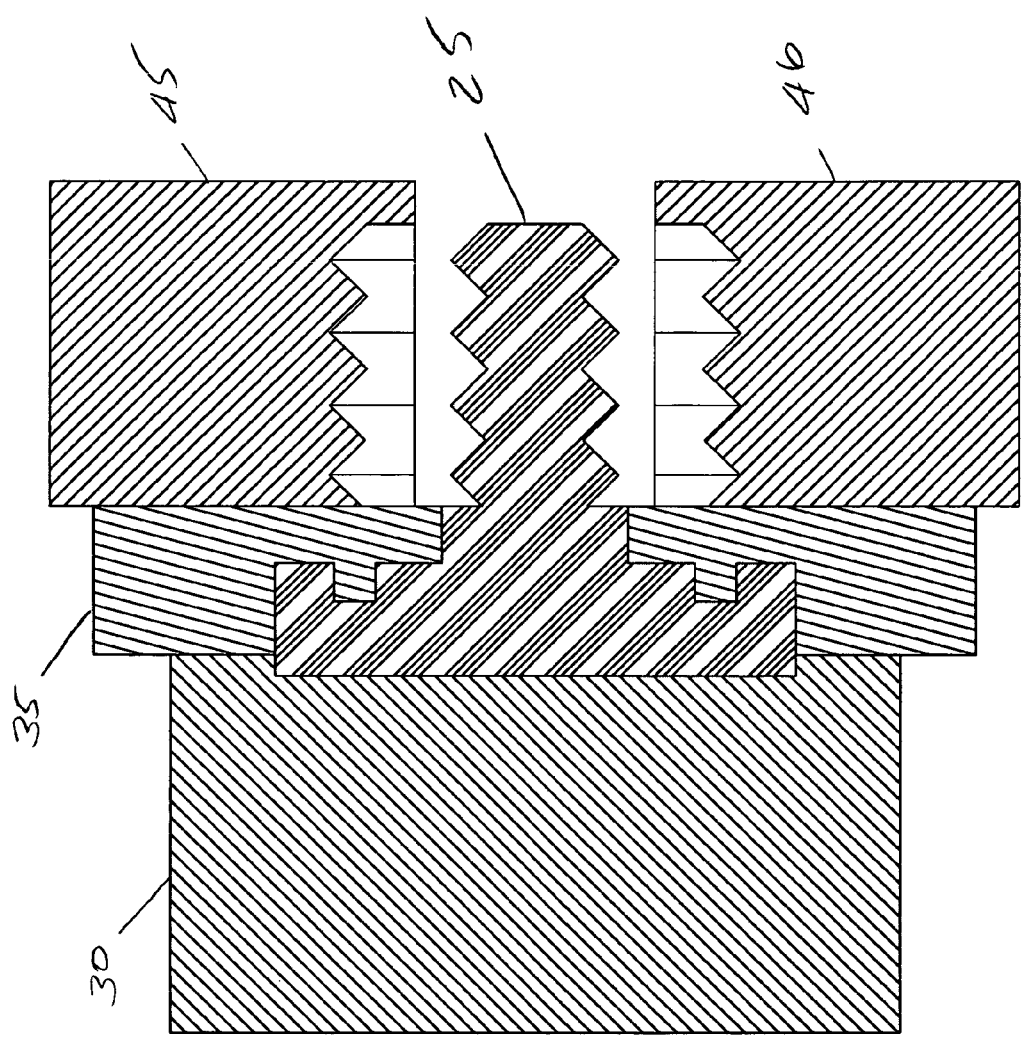

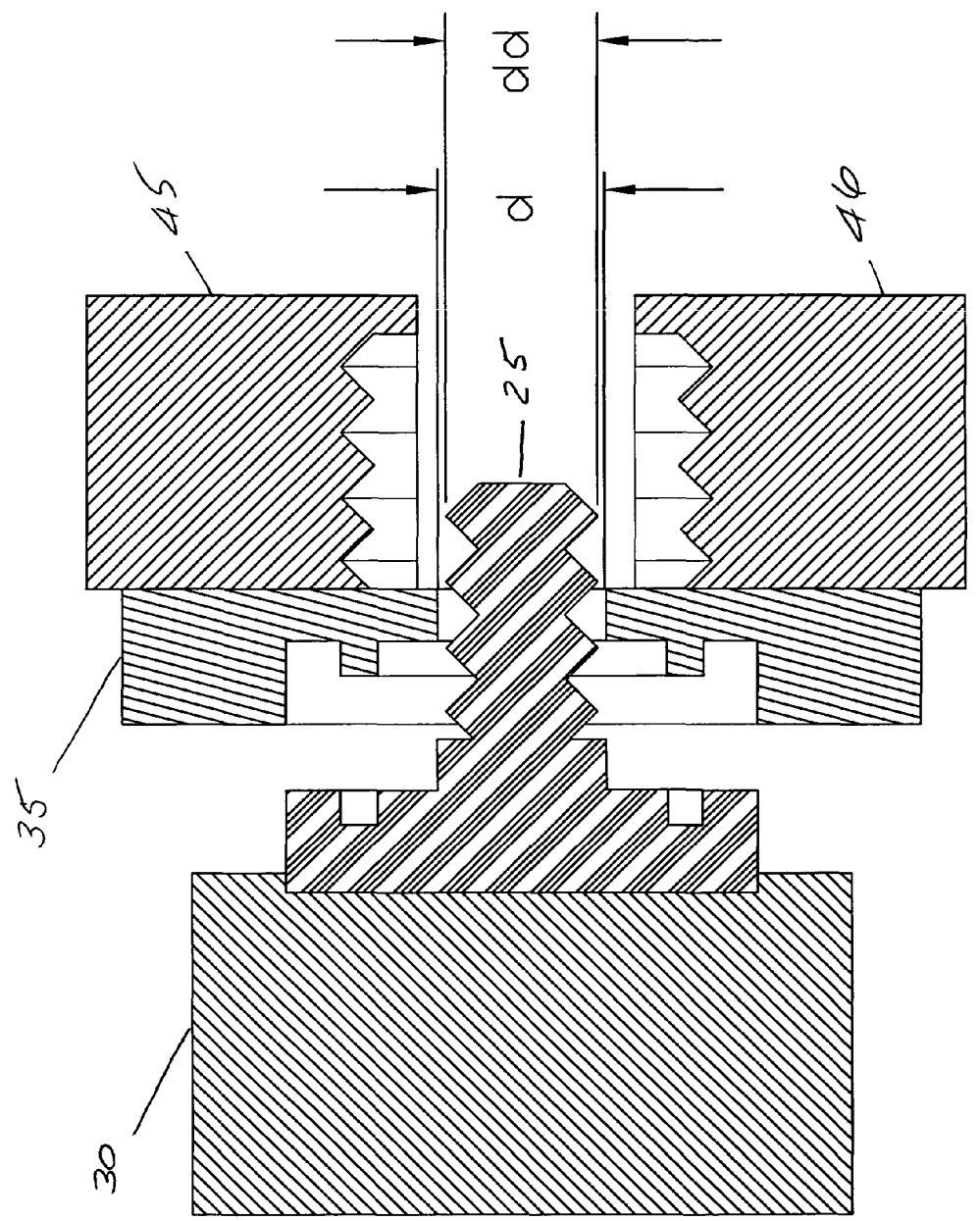

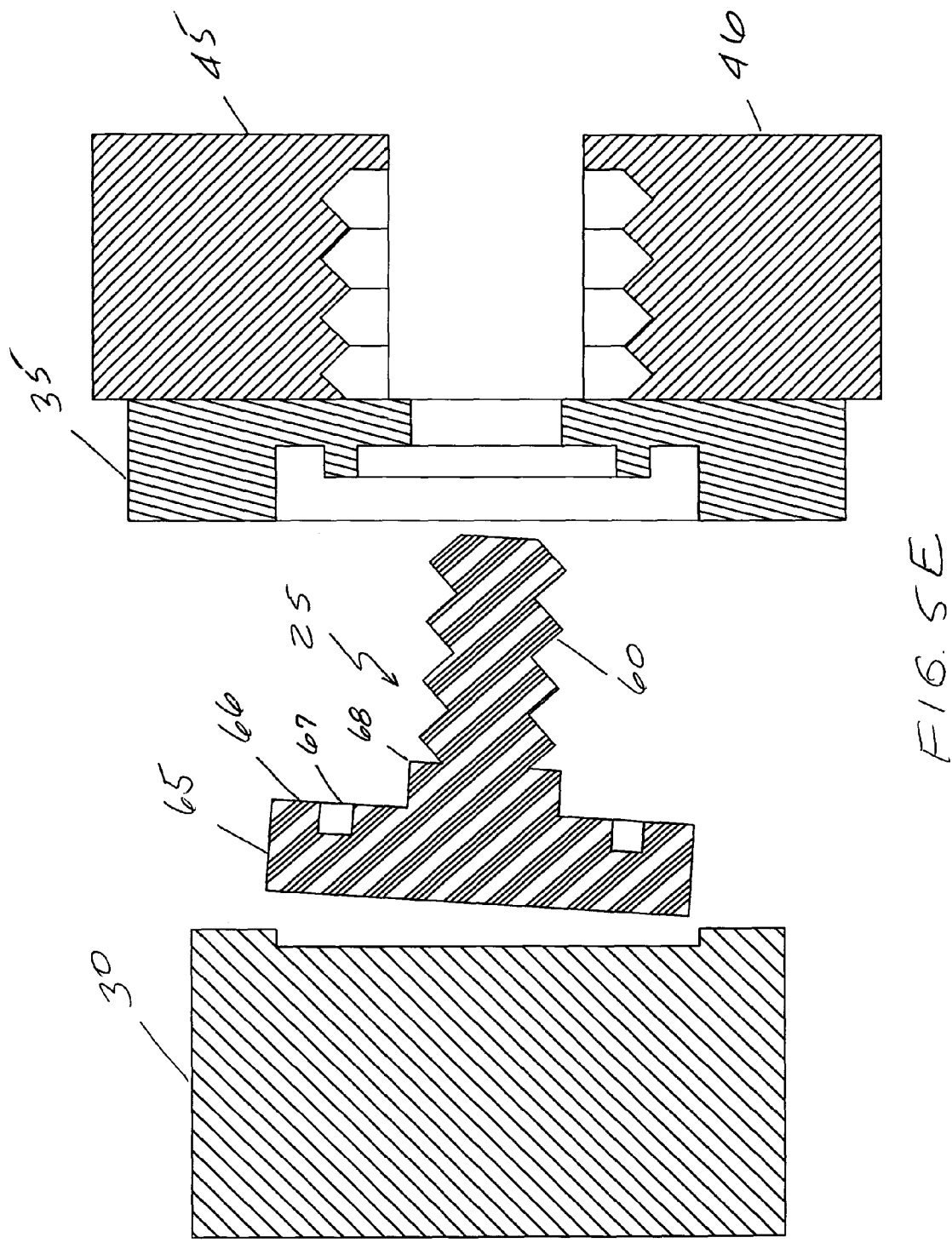

METHOD OF MOLDING A BULKHEAD FITTING

RELATED APPLICATION

This application relates to and claims the benefit under 35 U.S.C. §119(e) of U.S. Provisional Application No. 60/655,408, filed Feb. 24, 2005.

TECHNICAL FIELD

This application relates to the manufacture of bulkhead fittings and more particularly to a bulkhead fitting for a spa or hot tub with the fitting having a sealing surface containing an o-ring grove.

BACKGROUND

A leak resistant seal around an opening through a bulkhead is sometimes provided by using a bulkhead fitting. As illustrated in the cross-sectional diagram of FIG. 1, the fitting 1 typically has a cylindrically shaped flange 2 and an integral threaded member 3 that is normal to the flange with the axis of the threaded part coextensive with the axis of the flange. One side of the flange is designed to function as a sealing surface, which abuts against one side of the bulkhead, and an o-ring groove 4, containing a resilient o-ring 5, is formed within the sealing surface. The fitting is used to seal the opening through the bulkhead by passing the threaded member through the opening and fastening the fitting to the bulkhead by using a retaining nut 6 threaded onto the threaded member. When the retaining nut is fully screwed against the bulkhead, the resilient o-ring partially compresses against the other side of the bulkhead, thereby forming the seal.

Although several methods might be utilized to manufacture bulkhead fittings, one of the most desirable methods would be to manufacture the fittings using injection molding techniques that are capable of molding large volumes of fittings at relatively low cost. Unfortunately, however, attempting to mold a bulkhead fitting with the configuration described above presents some serious limitations. As illustrated in FIG. 2 the most economical manner to mold the fitting would be to utilize a pair of movable slide blocks 7 and 8, with the blocks configured to abut against a core plate 9. When the blocks and plate are assembled in this fashion they form a mold assembly having an internal cavity with an inside surface having the same shape as the outside surface of the bulkhead fitting. The bulkhead fitting would then be formed by injecting a liquid material, for example molten plastic, into the cavity and allowing the material to cool, thereby forming the fitting. The next step would be to separate the pair of slide blocks by moving them away from the threaded member and parallel to the cylindrical flange. But, separating the slide blocks in this fashion would not be possible without damaging the fitting due to the existence of that portion of the mold forming the o-ring groove, which effectively traps the fitting in the mold. Even if the fitting were somehow removed from the mold, for example while the fitting were still somewhat pliable, the fitting would retain the image of the pair of slide blocks in the form of a "parting-line": a slightly raised portion of the fitting formed in a plane coextensive with the axis of the fitting and running through the fitting's sealing surface and o-ring groove. The portion of the parting-line extending through the sealing surface and o-ring groove would potentially compromise the ability of the o-ring to form a watertight seal.

One technique to remove the fitting and avoid the formation of a parting-line would be to form a mold by utilizing a single block and a core plate as shown in FIG. 3. The fitting could then be removed by simply unscrewing the fitting from the block portion of the mold. This technique has the obvious draw back of consuming a lot of time and energy extracting the part from the mold, thereby negating the primary advantage of reducing the cost to mold the fitting. A further disadvantage is that there is an increased capital cost to manufacture the injection mold needed to make the fitting.

Another significant limitation in the technique of unscrewing the fitting from the mold is that the technique obviously only works if the fitting has a threaded member and the fitting is symmetrical about its longitudinal axis, otherwise the fitting could not be unscrewed from the mold. As shown in FIG. 4, this condition would exist if the fitting were adapted to be used as a fitting for a spa or hot tub, and the fitting contained one inlet for water 10 and another inlet for air 11, both of which protrude away from the fitting. This figure also illustrates the existence of a parting line 12 which is the result of using traditional methods of injection molding to form the apart.

Accordingly, what is needed is an improved method of molding a bulkhead fitting that allows the fitting to be quickly and easily removed from a mold assembly, without damaging the fitting and without compromising the ability of the fitting to form a water tight seal by creating a parting-line extending through the sealing surface and the o-ring groove.

SUMMARY

A method of using an injection mold assembly to fabricate a bulkhead fitting is presented. The method comprises providing a core plate having a shut-off surface; an aperture plate having a first shut-off surface, a second shut-off surface, and an opening through the plate, with the opening having a first aperture that extends through the first shut-off surface, and having a second aperture that extends through the second shut-off surface, with the second aperture having a predetermined diameter. The first shut-off surface of the aperture plate is positioned adjacent to the first shut-off surface of the core plate. Also provided are first and second of slide blocks that are removably positioned adjacent to each other so as to form a shut-off surface and a cavity with the cavity having an open end extending through the shut-off surface, with the open end forming an aperture with a predetermined diameter that is less than the diameter of the second aperture of the aperture plate. The shut-off surface of the slide blocks is positioned adjacent to the second shut-off surface of the aperture plate, whereby the relative positions of the slide blocks, aperture plate and core plate form the mold assembly containing a mold cavity.

The bulkhead fitting is molded by injecting the mold cavity with an injectable material and allowing the material to solidify, which forms the bulkhead fitting within the mold cavity, with the fitting having an elongate member with a predetermined diameter, a sealing flange member normal to the elongate member, said sealing flange member having a sealing surface, which may include an o-ring groove, formed within the sealing surface, and a shoulder member integral to the elongate member and to the sealing flange member, with the shoulder member having a diameter which is approximately equal to the diameter of the second aperture of the aperture plate, said diameter of the second aperture of the aperture plate being greater than the diameter of the elongate member.

The bulkhead fitting is removed from the mold assembly by moving the first and second slide blocks generally parallel to the second shut-off surface of the aperture plate until the blocks no longer engage the fitting, moving the aperture plate generally perpendicular to the shut-off surface of the core plate until it passes or clears the bulkhead fitting, and removing the fitting from the core plate.

BRIEF DESCRIPTION OF THE DRAWINGS

FIG. 5B is the same cross-sectional view as in FIG. 5A and further illustrating the formation of the bulkhead fitting within the mold.

FIG. 5C is the same cross-sectional view as in FIG. 5B and further illustrating the removal of slide blocks.

FIG. 5D is the same cross-sectional view as in FIG. 5C and further illustrating the removal of the slide blocks and removal of an aperture plate from a core plate.

FIG. 5E is the same cross-sectional illustration as in FIG. 5D and further illustrating the removal of the slide blocks, removal of the aperture plate from the core plate, and removal of the bulkhead fitting.

FIG. 5F is a front perspective view of the bulkhead fitting that has been molded as illustrated in FIG.'s 5A through 5E and that is symmetrical about a longitudinal axis, further illustrating that that a parting-line does not extend through a sealing surface and an o-ring groove on the surface of the fitting. The section line I-I illustrates the direction of the view for the cross-sections of FIG.'s 5A-5E.

DETAILED DESCRIPTION OF PREFERRED EMBODIMENTS

Figure 1:
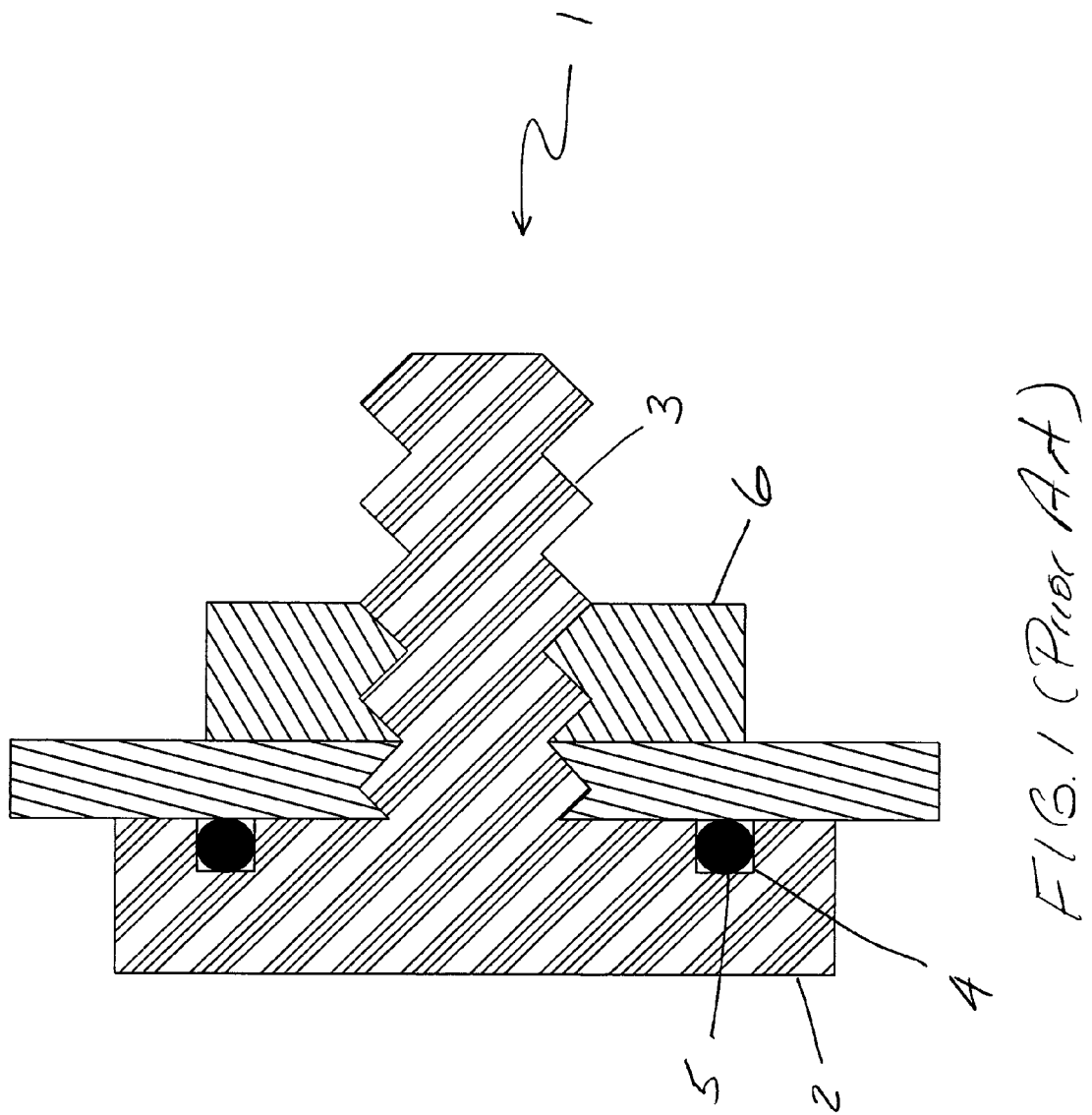
FIG. 1 (Prior Art) is a cross-sectional side elevational view of a bulkhead fitting which is secured to a bulkhead, with the fitting being symmetrical about a longitudinal axis and the cross-section taken of a plane through said axis.
Figure 2:
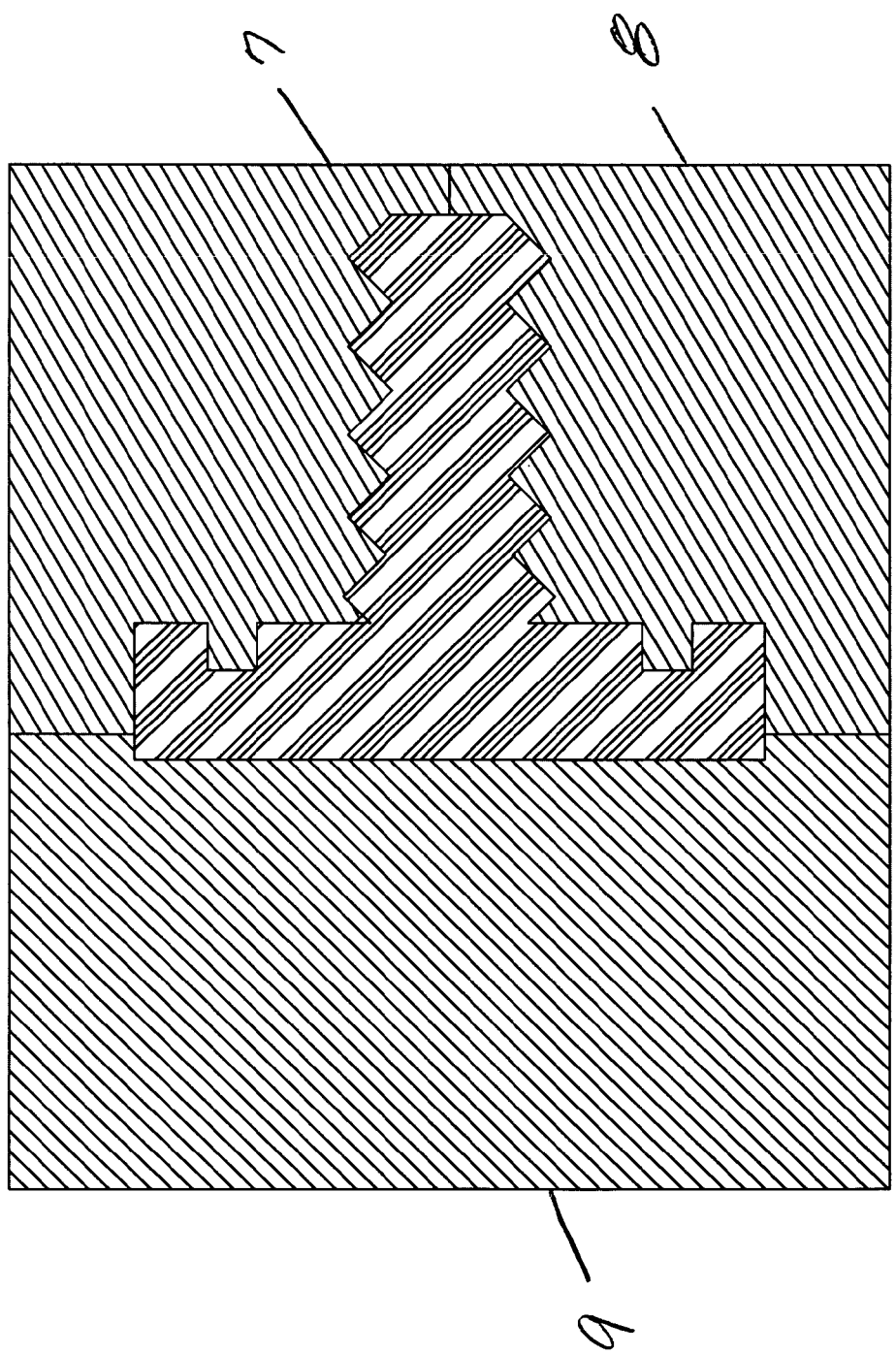
FIG. 2 (Prior Art) is a cross-sectional side elevational view of a mold assembly for fabricating a bulkhead fitting within the mold, with the fitting being symmetrical about a longitudinal axis and with the cross-section taken of a plane through said axis.
Figure 3:
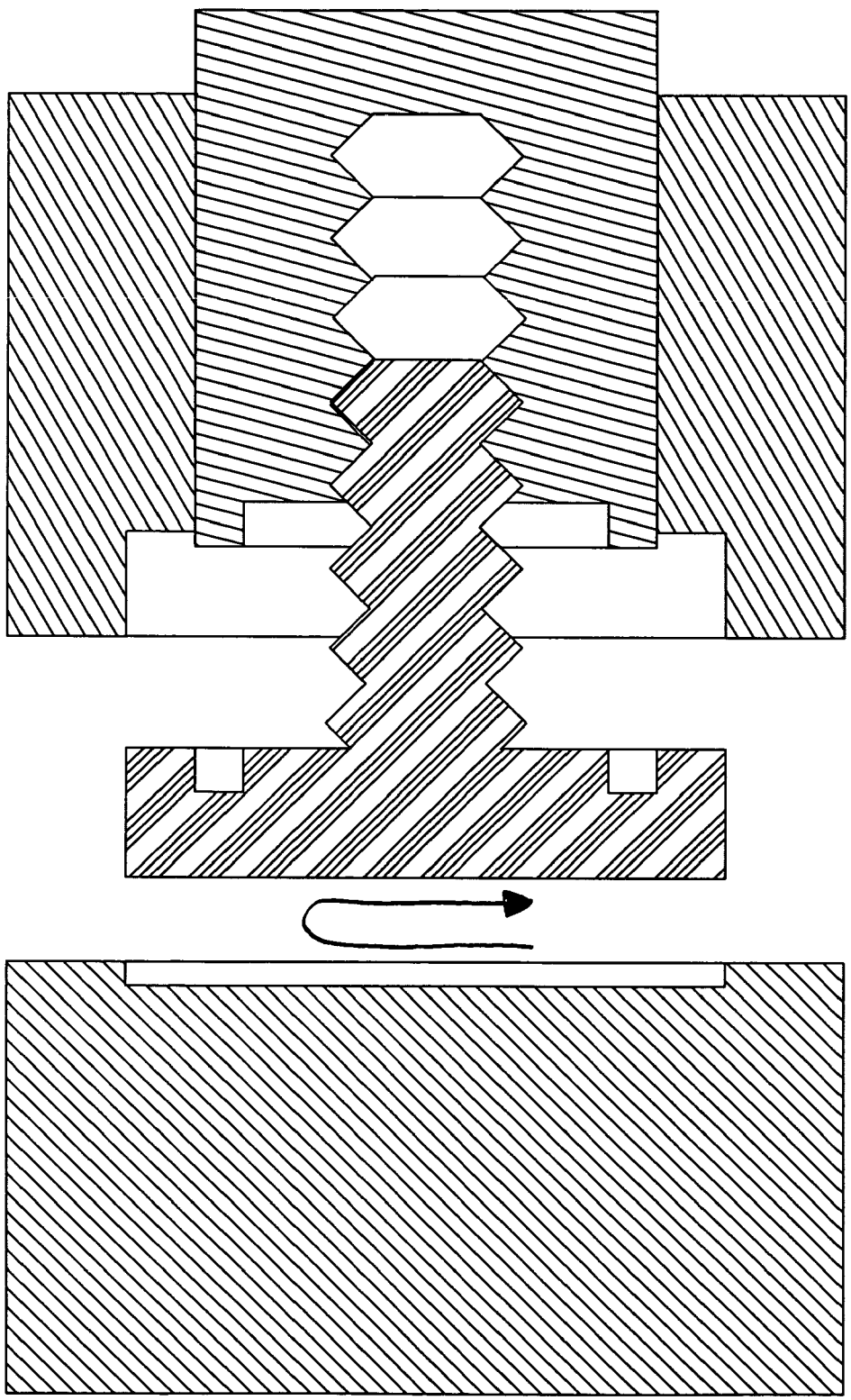
FIG. 3 (Prior Art) is a cross-sectional side elevational view of a mold assembly illustrating a method for removing a bulkhead fitting from a mold assembly, in which the fitting is symmetrical about a longitudinal axis and with the cross-section taken of a plane through said axis.
Figure 4:
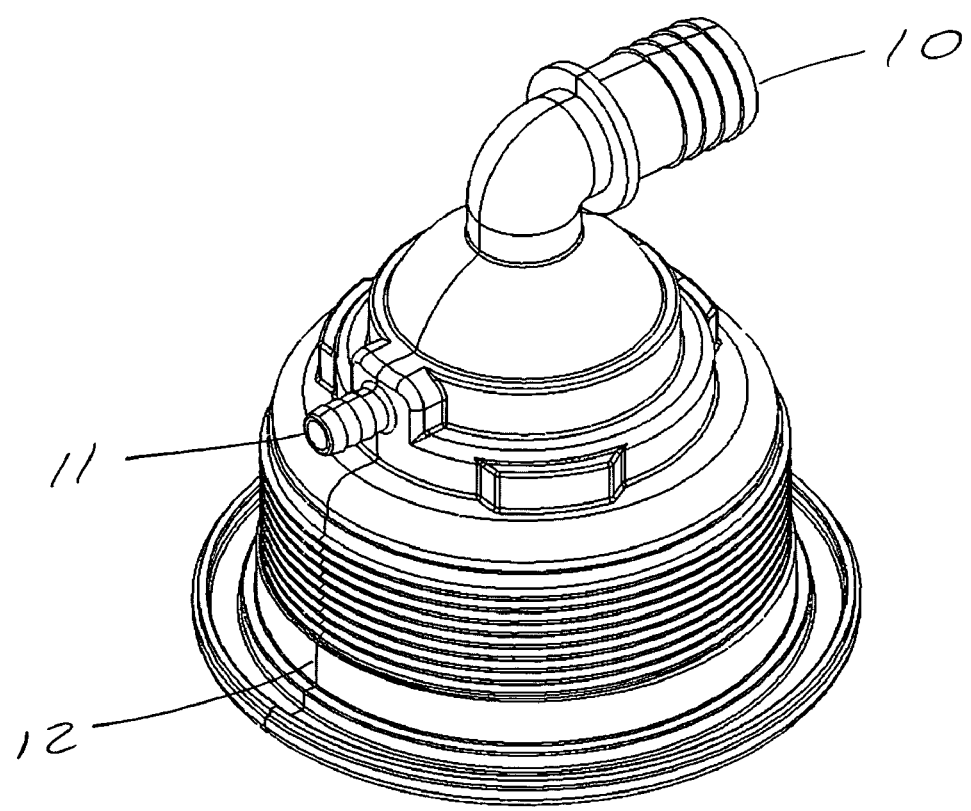
FIG. 4 (Prior Art) is a front perspective view of a bulkhead fitting that has an inlet for water and an inlet for air.

FIG.'s 5A, 5B, 5C, 5D, and 5E illustrate a preferred method of using an injection mold assembly 20 to fabricate a bulkhead fitting 25 that is symmetrical about a longitudinal axis. The term "bulkhead fitting" as used in this Detailed Description primarily refers to a spa or hot tub fitting that forms a water-tight seal around an opening through a bulkhead, normally referred to as a "spa shell", of a spa or hot tub, but also includes other types of fittings that are intended to form a water-tight seal around an opening through other bulkheads. The mold assembly 20 has a core plate 30 that has a shut-off surface 31 and cylindrically shaped recessed portion 32 formed within the shut-off surface 31, with the recessed portion 32 having a predetermined diameter. The mold assembly 20 also has an aperture plate 35 that has shut-off surface 36, an opposite shut-off surface 37, and an opening 38 through the aperture plate 35. The opening 38 has a cylindrically shaped first aperture 39 that extends through the shut-off surface 37, with the first aperture 39 having a predetermined diameter which is approximately equal to the diameter of the recessed portion 32 of the core plate 30. The opening 38 also has a cylindrically shaped second aperture 40 that extends through the shut-off surface 36, with the second aperture 40, as specifically shown in FIG. 7, having a predetermined inside diameter d. Partial assembly of the mold assembly 20 is carried out by positioning the shut-off surface 37 of the aperture plate 35 adjacent to the shut-off surface 31 of the core plate 30. The mold assembly 20 also has a pair of slide blocks 45 and 46 that are removably positioned adjacent to each other so as to form a shut-off surface 47 and a threaded cavity 48. The threaded cavity 48 has an open end extending through the shut-off surface 47, so as to form a cylindrically shaped aperture 49 with a predetermined inside diameter that is less than the diameter d of the second aperture 40 of the aperture plate 35. Assembly of mold assembly 20 is completed by positioning the shut-off surface 47 of the pair of slide blocks 45 and 46 adjacent to the shut-off surface 36 of the aperture plate 35. Assembling the pair of slide blocks 45 and 46, aperture plate 35, and core plate 30 in this fashion creates the mold assembly 20 containing a mold cavity 21.

Using injecting molding techniques that are well know to those persons skilled in the art, the bulkhead fitting 25 is molded within the mold cavity 21 by injecting an injectable material, generally in a liquid state and preferably molten plastic, into the cavity and allowing the material solidify, which forms the bulkhead fitting 25 within the mold cavity 21. The bulkhead fitting 25 molded in this manner includes: a cylindrically shaped elongate threaded member 60 having a nominal axis and outside diameter dd; a cylindrically shaped sealing flange member 65 normal to the threaded member 60, with the sealing flange member 65 having a sealing surface 66, including an o-ring groove 67 formed within the sealing surface; and a cylindrically shaped shoulder member 68 integral to the threaded member 60 and to the sealing flange member 65, with the shoulder member 68 having an outside diameter which is approximately equal to the inside diameter d of the second aperture 40 of the aperture plate 35, said diameter d being greater than the outside diameter dd of the threaded member 60.

Figure 5A:
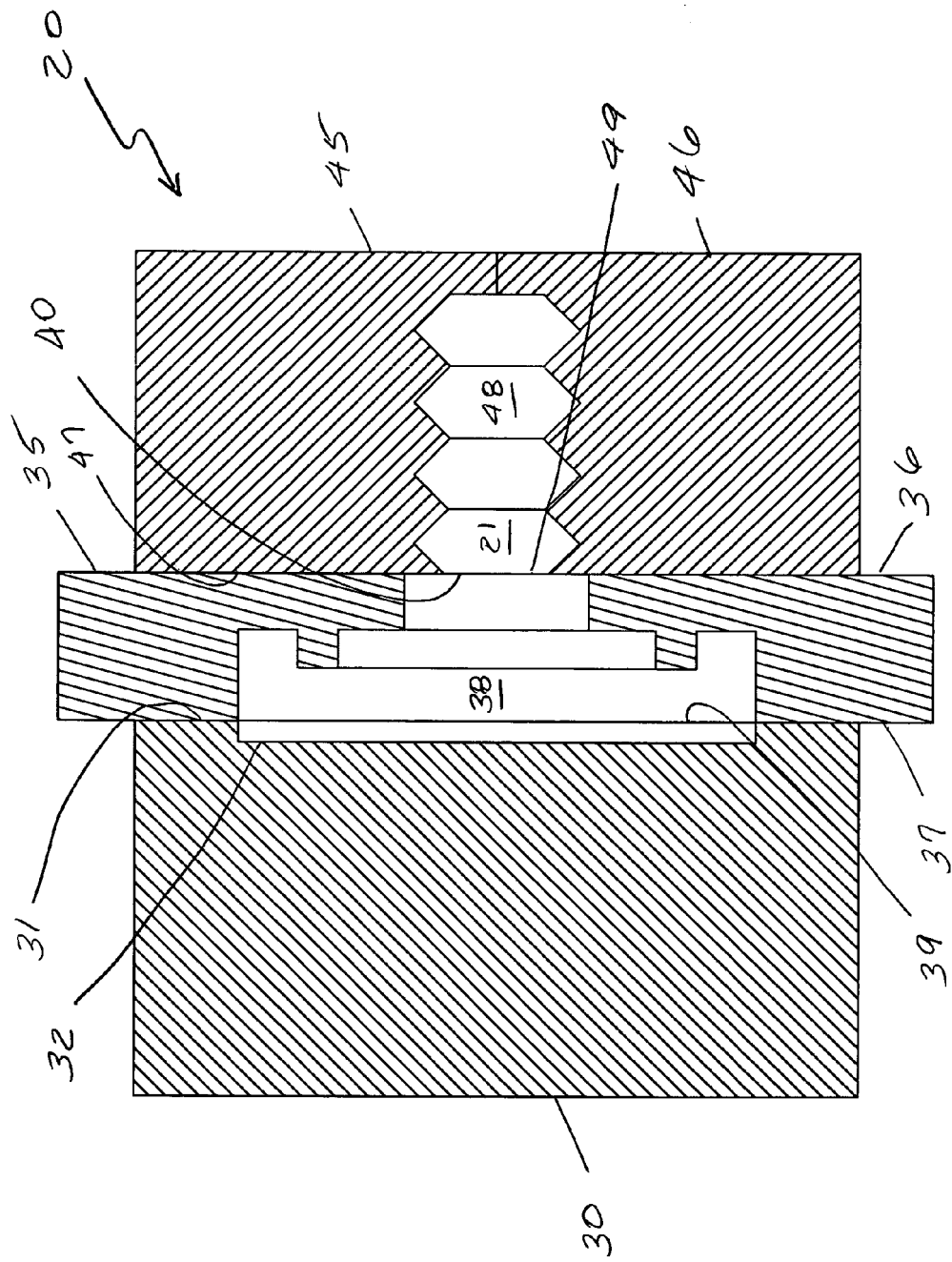
FIG. 5A is a cross-sectional side elevational view of a mold assembly for fabricating a bulkhead fitting within the mold, with the fitting being symmetrical about a longitudinal axis and the cross-section taken of a plane through said axis.

The bulkhead fitting 25 is removed from the mold assembly 20, as specifically shown in FIG. 5C, by simultaneously separating the pair of slide blocks 45 and 46 and moving the blocks in a direction that is generally parallel to the shut-off surface 36 of aperture plate 35 or generally perpendicularly to the nominal axis of the threaded member 60 until the blocks no longer engage the threaded member 60. Alternatively, the slide blocks 45 and 46 can be moved away from the shut-off surface 36 of the aperture plate 35 and away from the nominal axis of the threaded member 60 at predetermined angles to the shut-off surface and the nominal axis. Next, as shown in FIG.

5D, the aperture plate 35 is removed by moving the aperture plate 35 in a direction that is generally perpendicular to the shut-off surface 31 of the core plate 30 until the aperture plate 35 clears or passes the threaded member 60. By specifying that the second aperture 40 of aperture plate 35 has the diameter d, which is greater than the diameter dd of the threaded member 60, the aperture plate 35 readily clears or passes the thread member 60. Lastly, as illustrated in FIG. 5E, the bulkhead fitting 25 is removed from the core plate 30 by pulling the fitting 25 out of the cylindrically shaped recessed portion 32 of the core plate 30, or simply allowing the fitting to drop out of the recessed portion, whereby a parting line does not extend through the sealing surface 66 or the o-ring groove 67 of the flange member 65 of the fitting 25.

The method of using an injection mold assembly to mold a bulkhead fitting that is symmetrical about a longitudinal axis can also be used to mold a bulkhead fitting that is not symmetrical about a longitudinal axis. Specifically, referring to FIG.'s 6A, 6B and 6C, a mold assembly 70 is used to fabricate a bulkhead fitting 75 that is only symmetrical about a longitudinal pane. The mold assembly 70 has a core plate 80 that has a shut-off surface 81, a cylindrically shaped recessed channel 82 formed within the shut-off surface 81, with the recessed channel 82 having an outer cylindrical wall 83 and an inner cylindrical wall 84, with the outer wall 83 having a predetermined diameter, and a conically shaped member 85, which is concentrically integral with the inner wall of channel 84, extends distally from the channel 82. The mold assembly 70 also has an aperture plate 90 that has shut-off surface 91, an opposite shut-off surface 92, and an opening 93 through the plate 90. The opening 93 has a cylindrically shaped first aperture 94 that extends through the shut-off surface 92, with the first aperture 94 having a diameter which is greater than the diameter of the outer wall 83 of recessed channel 82. The opening 93 also has a cylindrically shaped second aperture 95 that extends through the shut-off surface 91, with the second aperture 95 having a predetermined diameter d. Partial assembly of the mold assembly 70 is carried out by positioning the shut-off surface 92 of the aperture plate 90 adjacent to the shut-off surface 81 of the core plate 90, with the conically shaped member 85 of the core plate 80 extending through the opening 93 of the aperture plate 90. The mold assembly 70 also has a first slide block 100 and a second slide block 101 that are removably positioned adjacent to each other so as to form a shut-off surface 102 and a threaded cavity 103. The threaded cavity 103 has an open end extending through the shut-off surface 102, so as to form a cylindrically shaped aperture 104 with a diameter that is less than the diameter d of the second aperture 95 of the aperture plate 90. Assembly of mold assembly 70 is completed by positioning the shut-off surface 102 of the first and second slide blocks 100 and 101, respectively, adjacent to the shut-off surface 91 of the aperture plate 90. Assembling the first slide block 100, the second slide block 101, aperture plate 90, and core plate 80 in this fashion creates the mold assembly 70 containing a mold cavity 71.

Using injecting molding techniques that are well know to those persons skilled in the art, the bulkhead fitting 75 is molded within the mold cavity 71 by injecting an injectable material, generally in a liquid state and preferably molten plastic, into the cavity and allowing the material solidify, which forms the bulkhead fitting 75 within the mold cavity 71. The bulkhead fitting 75 molded in this manner is symmetrical about a longitudinal plane and includes: a cylindrically shaped elongate threaded member 110 having a nominal axis and an outside diameter dd; a cylindrically shaped sealing flange member 115 normal to the threaded member 110, with the sealing flange member 115 having a sealing surface 116, including an o-ring groove 117 formed within the sealing surface 116; and a cylindrically shaped shoulder member 118 integral to the threaded member 110 and to the sealing flange member 115, with the shoulder member 118 having and outside diameter which is approximately equal to the diameter d of the second aperture 95 of the aperture plate 90, said diameter d being greater than the outside diameter dd of the threaded member 110. The bulkhead fitting 70 further includes a water inlet member 120 and an air inlet member 121, both of which are integral with the threaded member 110 and are positioned opposite from each other, such that, for example, a longitudinal plane of the water inlet member 120 and a longitudinal plane of the air inlet member 121 are both coextensive with the longitudinal plane of the bulkhead fitting 75.

Figure 6A:
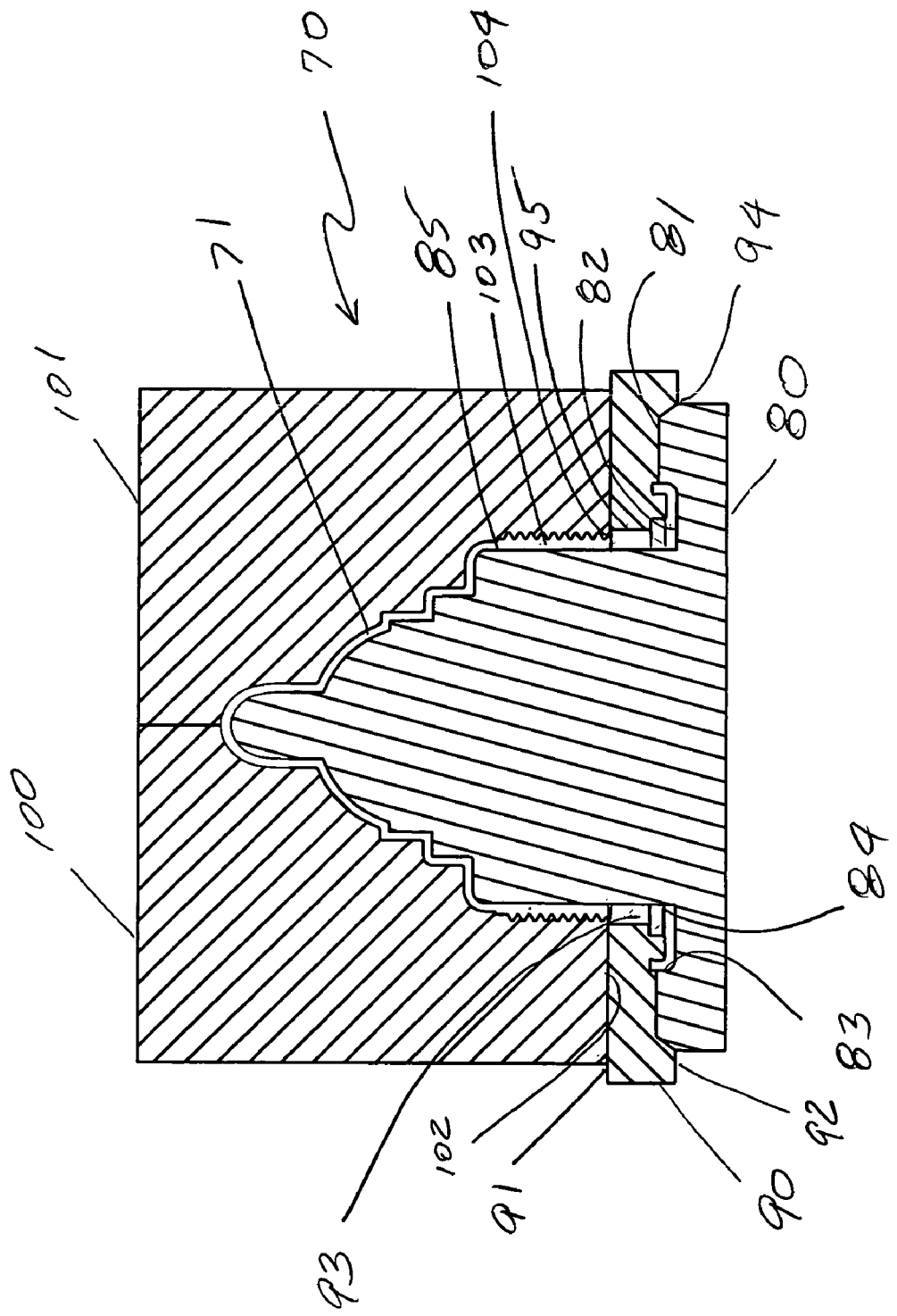
FIG. 6A is a cross-sectional side elevational view of a mold assembly for fabricating a bulkhead fitting within the mold, with the fitting being symmetrical about a horizontal plane and the cross-section taken through said plane.
Figure 6B:
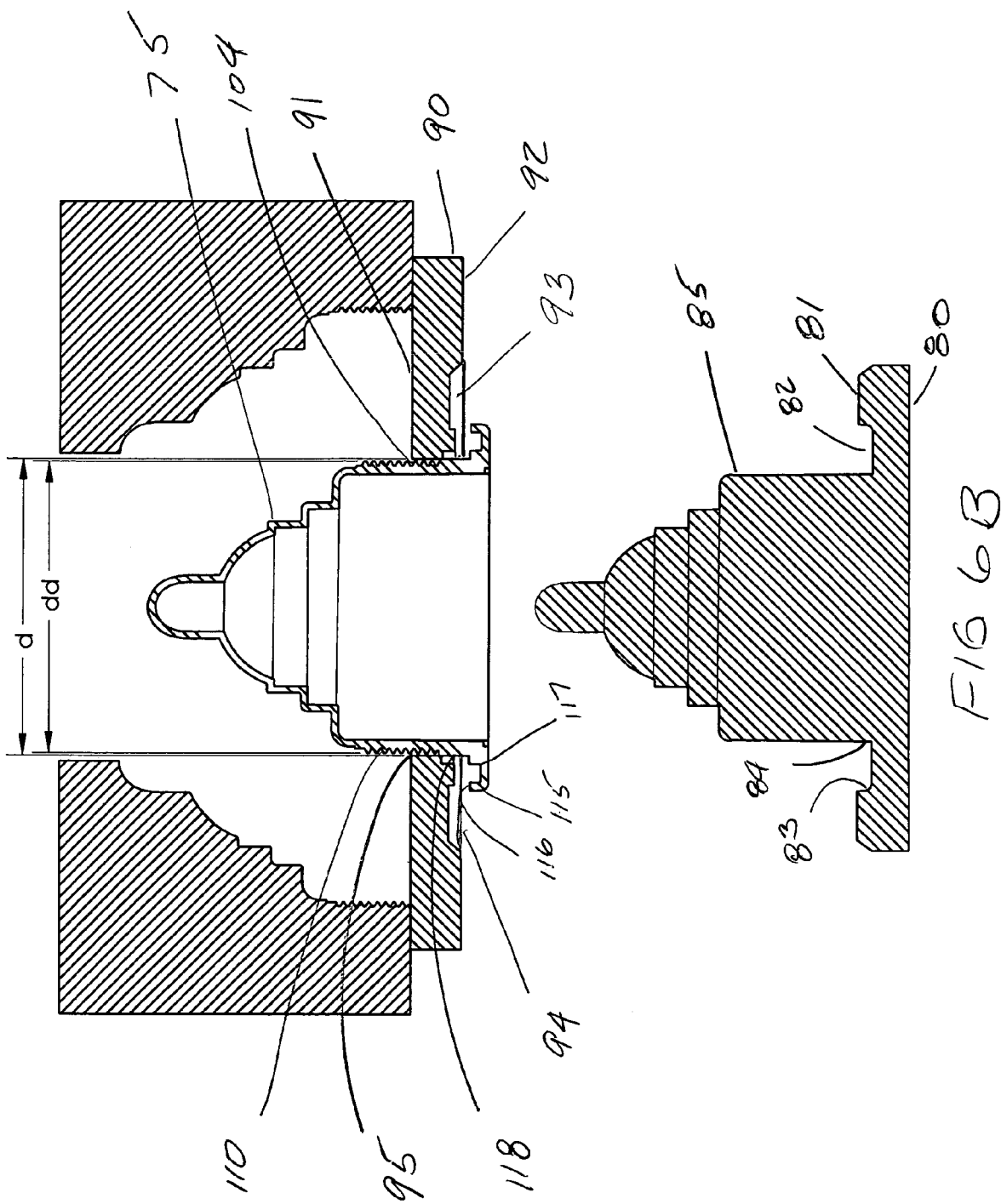
FIG. 6B is the same cross-sectional view as in FIG. 6A and further illustrating the removal of slide blocks, removal of an aperture plate from a core plate, and removal of the bulkhead fitting.
Figure 6C:
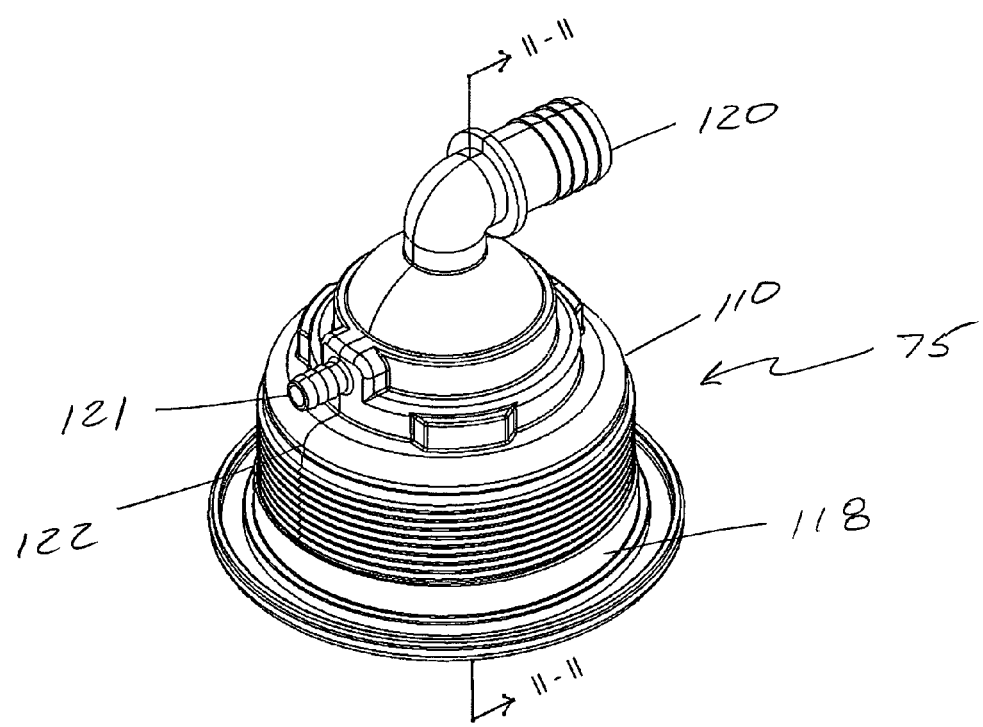
FIG. 6C is a front perspective view of the bulkhead fitting that has been molded as illustrated in FIG.'s 6A and 6B and that is symmetrical about a longitudinal plane, further illustrating that a parting-line does not extend through a sealing surface and an o-ring groove on the surface of the fitting. The section line II-II illustrates the direction of the view for the cross-sections of FIG.'s 6A-6B.

The bulkhead fitting 75 is removed from the mold assembly 70, as specifically shown in FIG. 6B, by simultaneously separating first and second slide blocks 100 and 101, respectively, and moving the blocks in a direction which is generally parallel to the shut-off surface 91 of the aperture plate 90 and generally perpendicular to the nominal axis of the threaded member 110 until the blocks no longer engage the threaded member 110. Alternatively, the slide blocks 100 and 101 can be moved away from the shut-off surface 91 of the aperture plate 90 and away from the nominal axis of the threaded member 110 at predetermined angles to the shut-off surface and the nominal axis. Next, as also shown in FIG. 6B, the aperture plate 90 is removed by moving the aperture plate in a direction that is generally perpendicular to the shut-off surface 81 of the core plate 80 until the aperture plate 90 clears or passes the threaded member 110. By specifying that the second aperture 95 of aperture plate 90 has the diameter d, which is greater than the outside diameter dd of the threaded member 110, the aperture plate 90 readily clears or passes the threaded member 110. The bulkhead fitting 75 is removed from the core plate 80 by pulling the fitting 75 out of the cylindrically shaped recessed channel 82 of the core plate 80, or simply allowing the fitting to drop out of the channel, and FIG. 6C illustrates the fitting 75 in a perspective view showing a parting line 122 which does not extend through the sealing surface 116 or the o-ring groove 117 of the flange member 115 of the fitting 75.

It will be apparent to those skilled in the art of injection molding methods that the method of using a mold assembly to mold a bulkhead fitting that is symmetrical about a longitudinal axis or symmetrical about a longitudinal plane can also be used to mold a bulkhead fitting that is not symmetrical about either a longitudinal axis or plane. For example, rather than positioning the water inlet member opposite from the air inlet member as shown in FIG.'s 6B and 6C, the inlets can be positioned at right angles to each other, such that a longitudinal plane of the water inlet is perpendicular to a longitudinal plane of the air inlet member, with the line of intersection of the planes being coextensive with the longitudinal axis of the bulkhead fitting. In addition, the inlets can be positioned at any predetermined angle to each other, such that a longitudinal plane of the water inlet forms the desired angle with a longitudinal plane of the air inlet, with the line of intersection of the planes being coextensive with or parallel to the longitudinal axis of the bulkhead fitting. Further, any number of inlets, outlets or other types of protruding members, which extend away from and are integral with the threaded member of the fitting, can be positioned in any predetermined manner, so long as the block slides can be moved generally parallel to the shut-off surface of the aperture plate without damaging the fitting. Moreover, although the fitting has been described as having a cylindrical threaded member, the method described herein can also be used to mold fittings which are substantially identical to the fittings described herein but do not have any threads and are not cylindrical, which would be the case if the fittings were secured through an opening in a bulkhead of a spa or hot tub by some means other than by screwing. For example, a fitting having water and air inlets as in FIG. 6C, but without any threads, could be secured by permanently clamping the fitting to the bulkhead of spa or hot tub, or the fitting could be a simple plug, without any orifices, using friction to hold it in place. Finally, although the sealing flange member has been described as having an o-ring groove, the o-ring groove can be omitted and the sealing surface of the sealing flange can be used to form the seal.

The novel and unique method of molding bulkhead fittings as described herein constitutes a substantial improvement over existing methods because the described method is a substantially more economical and efficient manner of producing fittings without parting lines across their sealing surfaces, which constitutes a substantial improvement over fittings that have sealing surfaces with parting lines. In this regard, a parting line is particularly problematic as it impacts the ability of an o-ring, or a gasket when the sealing flange does not contain an o-ring groove, to form a water-tight seal. When the o-ring is compressed within an o-ring groove containing a parting line, which typically extends normally to the o-ring, the parting line creates an indentation across the outside surface of the o-ring, which in turn extends across one of the o-ring's sealing surfaces. This indentation substantially compromises the ability to form a water-tight seal because the indentation creates a leak path across the seal.

Although the method of molding a bulkhead fitting has been described in its preferred embodiment and in certain other embodiments, it will be recognized by those skilled in the art that other embodiments and features may be provided without departing from the underlying principals of those embodiments. The scope of the invention is defined by the appended claims.

We claim:

1. A molding method for eliminating the creation of a parting line through a sealing surface of a molded bulkhead fitting, the molding method comprising:
   a) providing a core plate having a shut-off surface;
   b) providing a one-piece aperture plate having a first shut-off surface, a second shut-off surface, and an opening through the plate, said opening having a first aperture that extends through the first shut-off surface and having a second aperture that extends through the second shut-off surface, with the second aperture having a predetermined diameter;
   c) positioning the first shut-off surface of the aperture plate adjacent to the shut-off surface of the core plate;
   d) providing slide blocks removably positioned adjacent to each other so as to form a shut-off surface and a cavity, with the cavity having an open end extending through the shut-off surface and with the open end forming an aperture having a diameter that is less than the diameter of the second aperture of the aperture plate;
   e) positioning the shut-off surface of the slide blocks adjacent to the second shut-off surface of the aperture plate, whereby the relative positions of the slide blocks, aperture plate and core plate form a mold assembly containing a mold cavity;
   f) injecting the mold cavity with an injectable material and allowing the material to solidify, thereby forming the bulkhead fitting, said fitting having an elongate member with a nominal axis and predetermined diameter, a sealing flange member normal to the elongate member, said sealing flange member having a sealing surface, and a shoulder member integral to the elongate member and to the sealing flange member, with the shoulder member having a diameter which is approximately equal to the diameter of the second aperture of the aperture plate, said diameter of the second aperture of the aperture plate being greater than the diameter of the elongate member;
   g) moving the slide blocks until the blocks no longer engage the elongate member;
   h) separating the aperture plate from the sealing surface of the bulkhead fitting by moving the aperture plate in a direction away from the plane of the sealing surface, with the utilization of the aperture plate in the molding process eliminating the creation of a parting line through the sealing surface of the bulkhead fitting, and by moving the aperture plate in a direction away from the sealing surface, the surface is not marred by discontinuities such as smears, scratches, or scuffs that would otherwise result from the need to physically remove a parting line from the sealing surface; and
   i) removing the bulkhead fitting from the core plate, with the sealing surface of the bulkhead fitting free of any discontinuities and undisturbed from the condition the sealing surface had when the surface was originally solidified during the injection molding process.

2. The method of claim 1 in which the injectable material is molten plastic.

3. A molding method for eliminating the creation of a parting line through a sealing surface of a molded bulkhead fitting, comprising:
   a) providing a core plate having a shut-off surface;
   b) providing a one-piece aperture plate having a first shut-off surface, a second shut-off surface, and an opening through the plate, said opening having a first aperture that extends through the first shut-off surface and having a second aperture that extends through the second shut-off surface, with the second aperture having a predetermined diameter;
   c) positioning the first shut-off surface of the aperture plate adjacent to the shut-off surface of the core plate;
   d) providing slide blocks removably positioned adjacent to each other so as to form a shut-off surface and a cavity, with the cavity having an open end extending through the shut-off surface and with the open end forming an aperture having a diameter that is less than the diameter of the second aperture of the aperture plate;
   e) positioning the shut-off surface of the slide blocks adjacent to the second shut-off surface of the aperture plate, whereby the relative positions of the slide blocks, aperture plate and core plate form a mold assembly containing a mold cavity;
   f) injecting the mold cavity with an injectable material and allowing the material to solidify, thereby forming the bulkhead fitting, said fitting having an elongate member with a predetermined diameter, a sealing flange member normal to the elongate member, said sealing flange member having a sealing surface, including an o-ring groove formed within the sealing surface, and a shoulder member integral to the elongate member and to the sealing flange member, with the shoulder member having a diameter which is approximately equal to the diameter of the second aperture of the aperture plate, said diameter of the second aperture of the aperture plate being greater than the diameter of the elongate member;
   g) moving the slide blocks until the blocks no longer engage the elongate member;

h) separating the aperture plate from the sealing surface of the bulkhead fitting by moving the aperture plate in a direction away from the plane of the sealing surface, with the utilization of the aperture plate in the molding process eliminating the creation of a parting line through the sealing surface of the bulkhead fitting, and by moving the aperture plate in a direction away from the sealing surface, the surface is not marred by discontinuities such as smears, scratches, or scuffs that would otherwise result from the need to physically remove a parting line from the sealing surface; and i) removing the bulkhead fitting from the core plate, with the sealing surface of the bulkhead fitting free of any discontinuities and undisturbed from the condition the sealing surface had when the surface was originally solidified during the injection molding process.

4. The method of claim 3 in which the injectable material is molten plastic.

\* \* \* \* \*